(12) United States Patent
Mainiero

(10) Patent No.: US 10,677,121 B2
(45) Date of Patent: *Jun. 9, 2020

(54) OIL AND AIR SEPARATOR SYSTEM AND METHOD

(71) Applicant: Joe Mainiero, Lake Worth, FL (US)

(72) Inventor: Joe Mainiero, Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,602

(22) Filed: Aug. 6, 2019

(65) Prior Publication Data

US 2019/0360372 A1   Nov. 28, 2019

Related U.S. Application Data

(63) Continuation of application No. 16/280,979, filed on Feb. 20, 2019, now Pat. No. 10,408,100, which is a continuation-in-part of application No. 15/496,058, filed on Apr. 25, 2017, now Pat. No. 10,233,802.

(51) Int. Cl.
*F01M 13/04* (2006.01)
*F01M 13/00* (2006.01)
*B01D 46/00* (2006.01)
*B01D 46/44* (2006.01)

(52) U.S. Cl.
CPC ........ *F01M 13/04* (2013.01); *F01M 13/0011* (2013.01); *B01D 46/0002* (2013.01); *B01D 46/444* (2013.01); *B01D 2279/60* (2013.01); *F01M 2013/0044* (2013.01); *F01M 2013/0438* (2013.01); *F01M 2013/0488* (2013.01)

(58) Field of Classification Search
CPC ....... F01M 13/0405; F01M 2013/0438; F02M 35/10222; F02M 25/06; B01D 39/2041; B01D 46/003; B01D 46/106
See application file for complete search history.

(56) References Cited

U.S. PATENT DOCUMENTS

| | | | |
|---|---|---|---|
| 5,113,836 A * | 5/1992 | Sweeten ................. | F01M 9/02 123/573 |
| 7,118,614 B2 * | 10/2006 | Welin ................. | B01D 53/0415 96/132 |
| 10,408,100 B2 * | 9/2019 | Mainiero ........... | F01M 13/0011 |
| 2009/0050121 A1 * | 2/2009 | Holzmann ............. | B01D 45/04 123/573 |
| 2010/0242931 A1 * | 9/2010 | Huff ....................... | F02M 25/06 123/574 |
| 2012/0151887 A1 * | 6/2012 | Dorao ................... | B01D 45/14 55/437 |
| 2018/0216507 A1 * | 8/2018 | Mainiero ............... | F01M 11/04 |

* cited by examiner

*Primary Examiner* — Hung Q Nguyen
(74) *Attorney, Agent, or Firm* — Uradnik Law Firm PC

(57) ABSTRACT

An oil and air separator includes a first housing including a central chamber therein, the central chamber divided into a first outer portion and a second inner portion by a barrier; a filter material disposed between the first outer portion and the second inner portion; a cap directly coupled to the first housing, the cap including a first lumen therethrough, the first lumen including a first end disposed at the second inner portion; an extension portion including a second lumen therethrough; and a coupler removably coupling the cap and the extension portion.

14 Claims, 8 Drawing Sheets

OIL AND AIR SEPARATOR SYSTEM AND METHOD

RELATED APPLICATIONS

This application is a continuation of, and relates and claims priority to, U.S. patent application Ser. No. 16/280,979, filed on Feb. 20, 2019, now U.S. Pat. No. 10,408,100 issued on Sep. 10, 2019; which is a continuation-in-part of, and relates and claims priority to, U.S. patent application Ser. No. 15/496,058, filed on Apr. 25, 2017, now U.S. Pat. No. 10,233,802 issued on Mar. 19, 2019.

FIELD OF THE DISCLOSURE

The invention relates generally to engine positive crankcase ventilation (PCV) systems and methods for recycling blow-by gases through a PCV valve into the engine's intake manifold, and more particularly in one exemplary embodiment, to systems and methods including a clean-side oil and air separator system for removal of crankcase oil from blow-by gases in the recycling system upstream of the intake manifold.

BACKGROUND

In a combustion engine, blow-by gases typically include unburned gasoline. That is, an amount of air and unburned gasoline from the engine cylinder is pulled past the piston rings and into the crankcase. Instead of exhausting such blow-by gases to the atmosphere, a positive crankcase ventilation (PCV) system recycles the blow-by gases through a PCV valve into the engine's intake manifold. Such recycling occurs when the engine is operating at relatively slow speeds (e.g. idling), i.e., when the air pressure in the crankcase is higher than the air pressure in the intake manifold.

One problem associated with PCV systems and their use involves oil vapors. An engine's crankcase is used to store oil. A pan located below the crankshaft holds oil, and generally oil vapors from the oil in the pan may find their way into the blow-by gases.

It is undesirable for oil to be recycled with blow-by gases into an engine's intake manifold. Such oil may degrade engine performance by lowering the overall octane of the combustion mixture in a cylinder. Such oil also may coat the air intake and prevent airflow.

To combat the presence of oil in blow-by gases, "dirty-side" oil and air separators were developed to remove the oil from the blow-by gases before recirculation through the PCV valve and into the intake manifold. However, when the air pressure in the crankcase is higher than the air pressure in the intake manifold, it is also possible that blow-by gases will travel upstream (or backwards) into the "clean-side" assembly that leads from the PCV valve to the intake manifold.

There are various different models or types of oil and air separators available. One popular type of oil and air separator involves passing oily blow-by gases through a filter material. The oil collects in droplets on the filter material, which may be held in place by a screen. The oil is allowed to drop into the bottom of a can where the oil collects for later removal. This "can approach" to oil and air separation is not without its drawbacks, however.

SUMMARY

The present disclosure provides oil and air separation systems and methods. In one exemplary embodiment, an oil and air separator includes: (a) a first housing including a central chamber therein, the central chamber divided into a first outer portion and a second inner portion by a barrier; (b) a filter material disposed between the first outer portion and the second inner portion; (c) a cap directly coupled to the first housing, the cap including a first lumen therethrough, the first lumen including a first end disposed at the second inner portion; (d) an extension portion including a second lumen therethrough; and (e) a coupler removably coupling the cap and the extension portion. In an alternate embodiment, a sensor such as an air flow sensor, may be provided in combination with the oil and air separator.

Other benefits and advantages of the present disclosure will be appreciated from the following detailed description.

DETAILED DESCRIPTION

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to clean-side oil and air separation; etc. Such aspects related to this disclosure do not depart from the invention, and it is therefore intended that the invention not be limited by the certain aspects set forth of the events and circumstances related to this disclosure.

Figure 1:
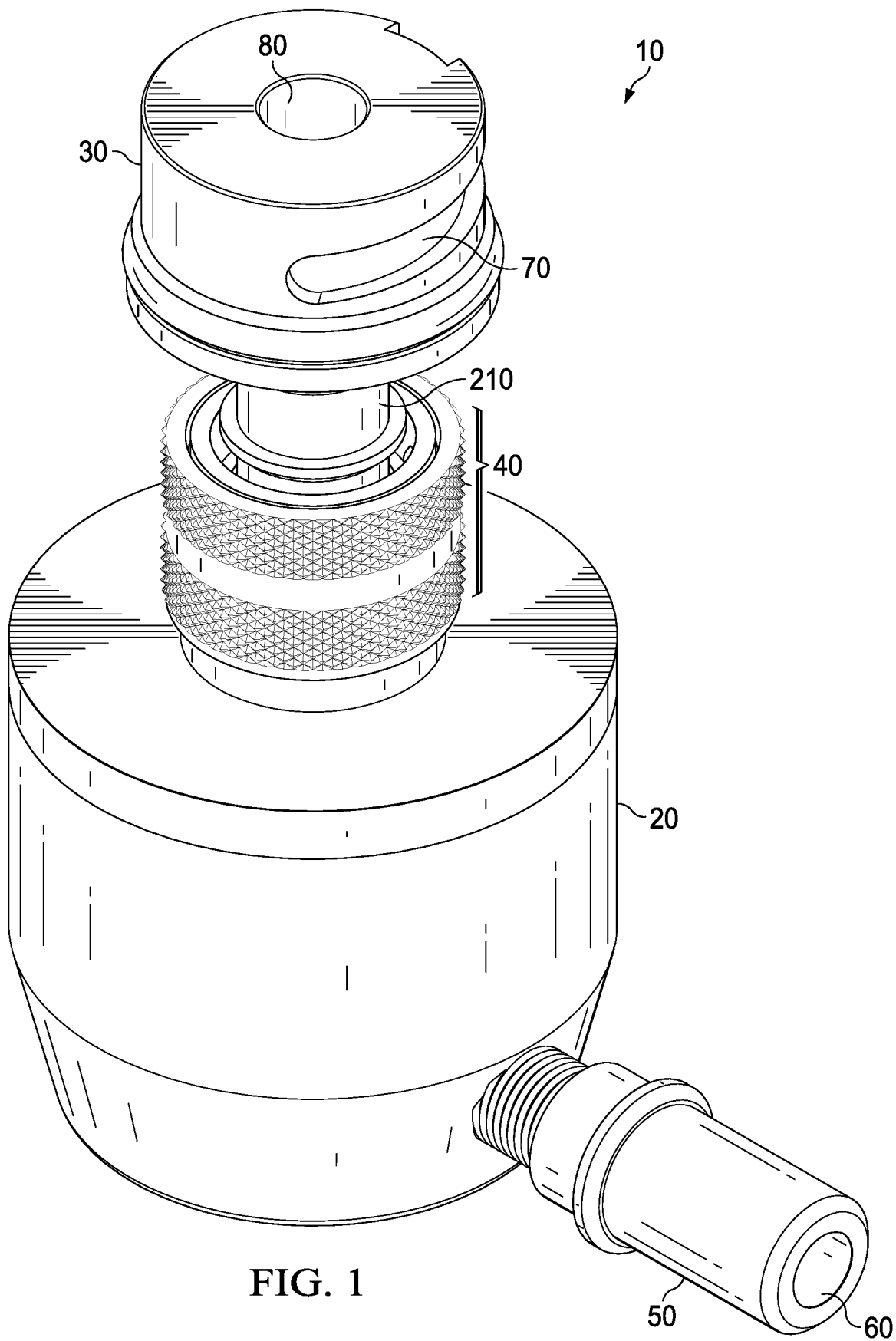
FIG. 1 is a perspective view of an exemplary embodiment of a clean-side oil and air separator.

Turning now to the drawings, FIG. 1 shows an exemplary embodiment of a clean-side oil and air separator 10 including a first housing 20, a second housing 30, and a coupler 40 removably connecting the first housing 20 and the second housing 30. The first housing 20 includes an air intake 50 including an air intake port 60. The air intake port 60 receives recycled blow-by gases that have passed through a PCV valve. The second housing 30 includes a threaded portion 70 that enables the second housing 30 to serve as a direct replacement for a removable engine oil fill cap. An o-ring 75 may be positioned about the second housing 30 to help reduce the outward passage of fluids at the engine oil fill port. The second housing 30 also includes an opening 80 that is in direct fluid communication with an engine's intake manifold when the second housing 30 is removably installed at the engine's engine oil fill port. A continuous fluid pathway is disposed within the first housing 20, the second housing 30, and the coupler 40 that extends between the air intake port 60 and the opening 80.

Figure 2:
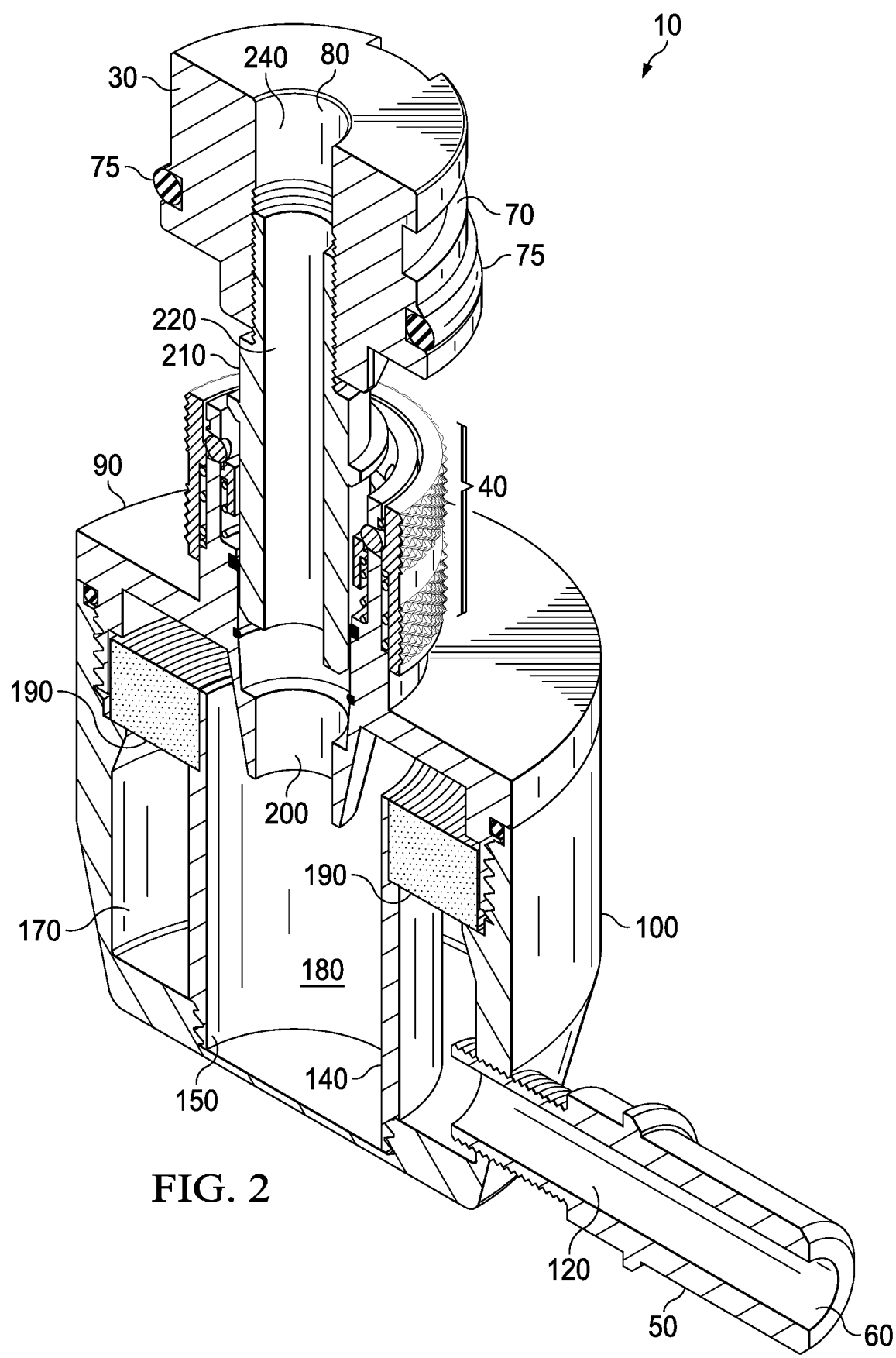
FIG. 2 is a sectional view of the exemplary embodiment of a clean-side oil and air separator shown in FIG. 1.
Figure 3:
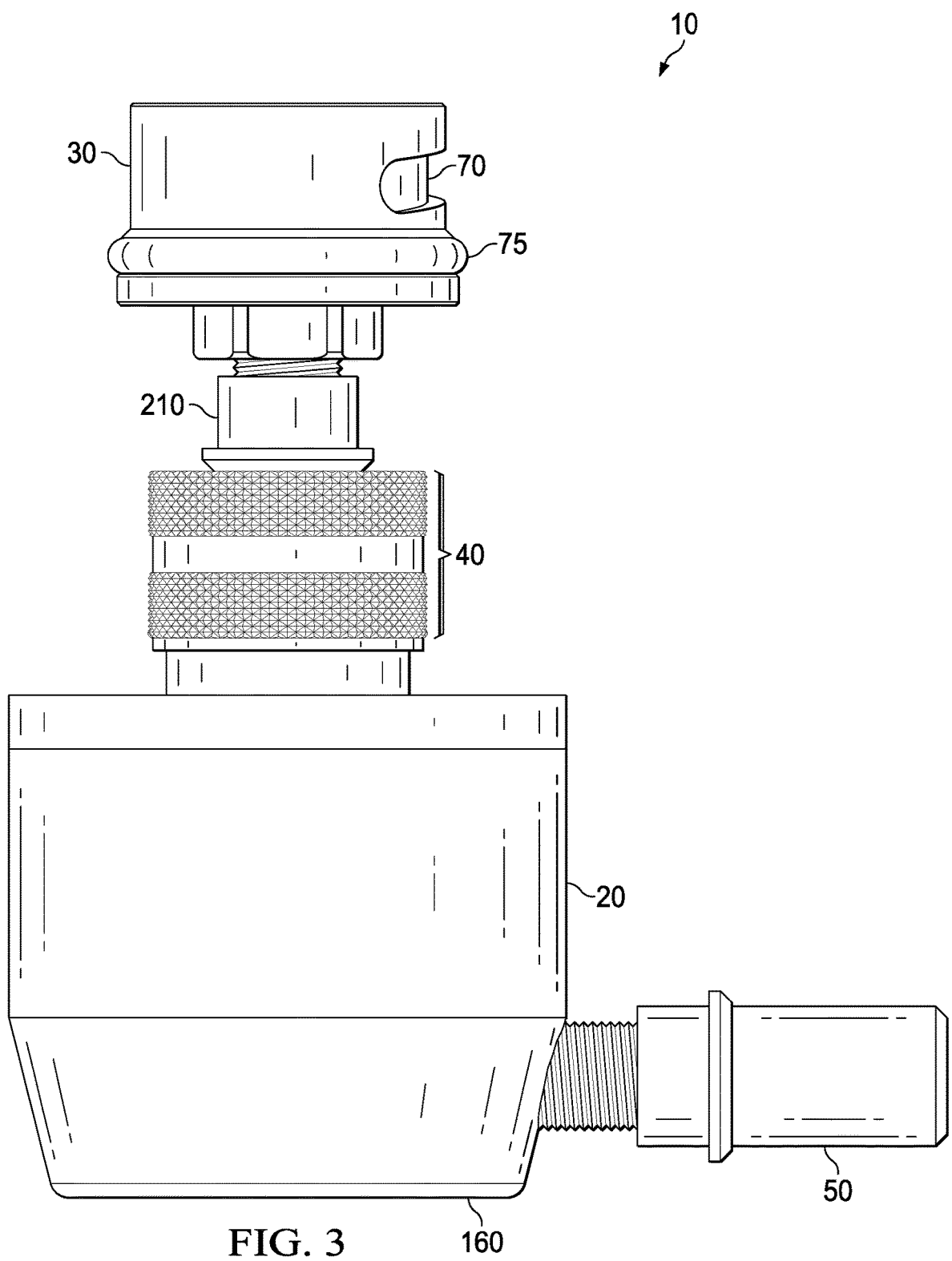
FIG. 3 is a side view of the exemplary embodiment of a clean-side oil and air separator shown in FIG. 1.
Figure 4:
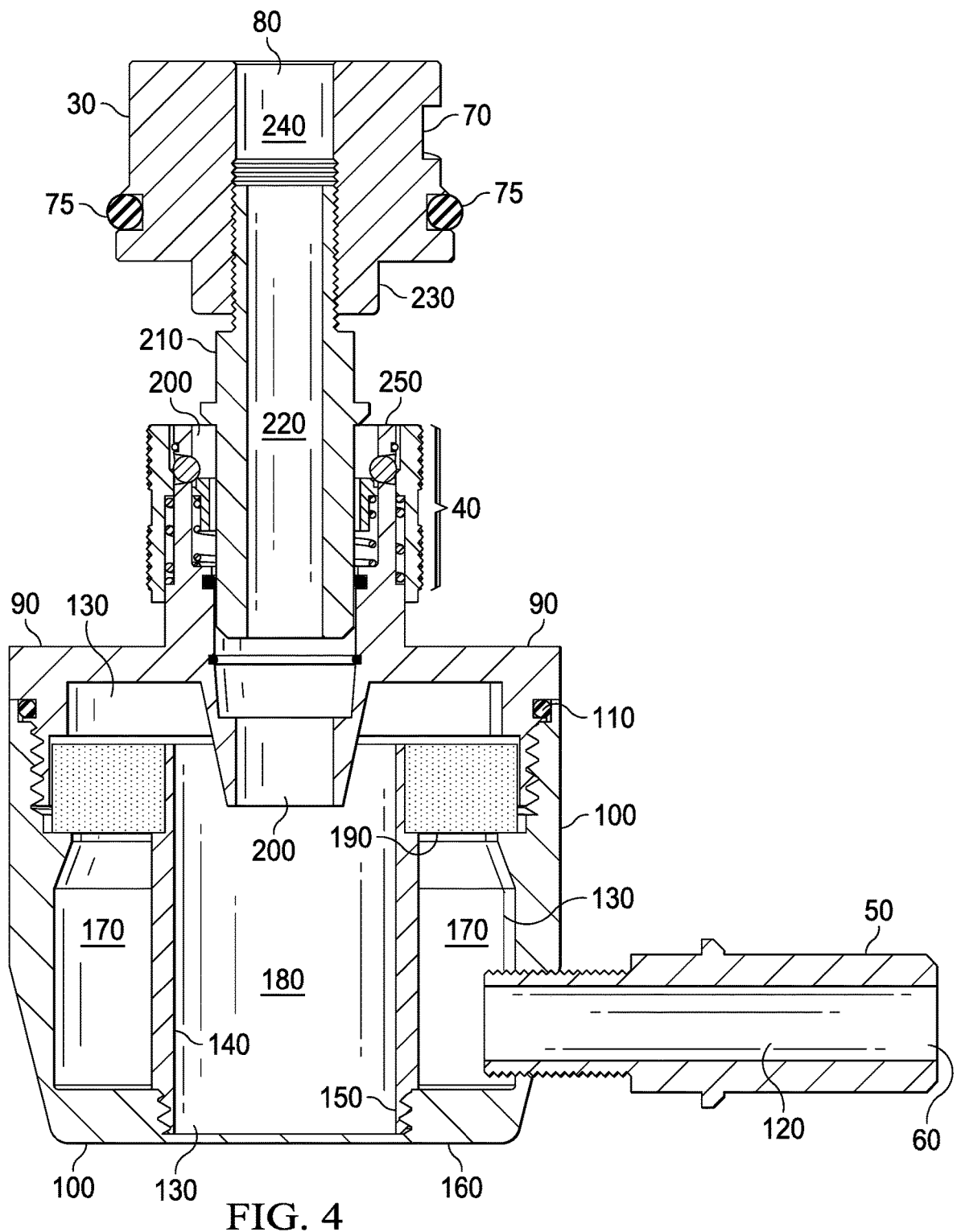
FIG. 4 is a cross-sectional view of the exemplary embodiment of a clean-side oil and air separator shown in FIG. 1.
Figure 5:
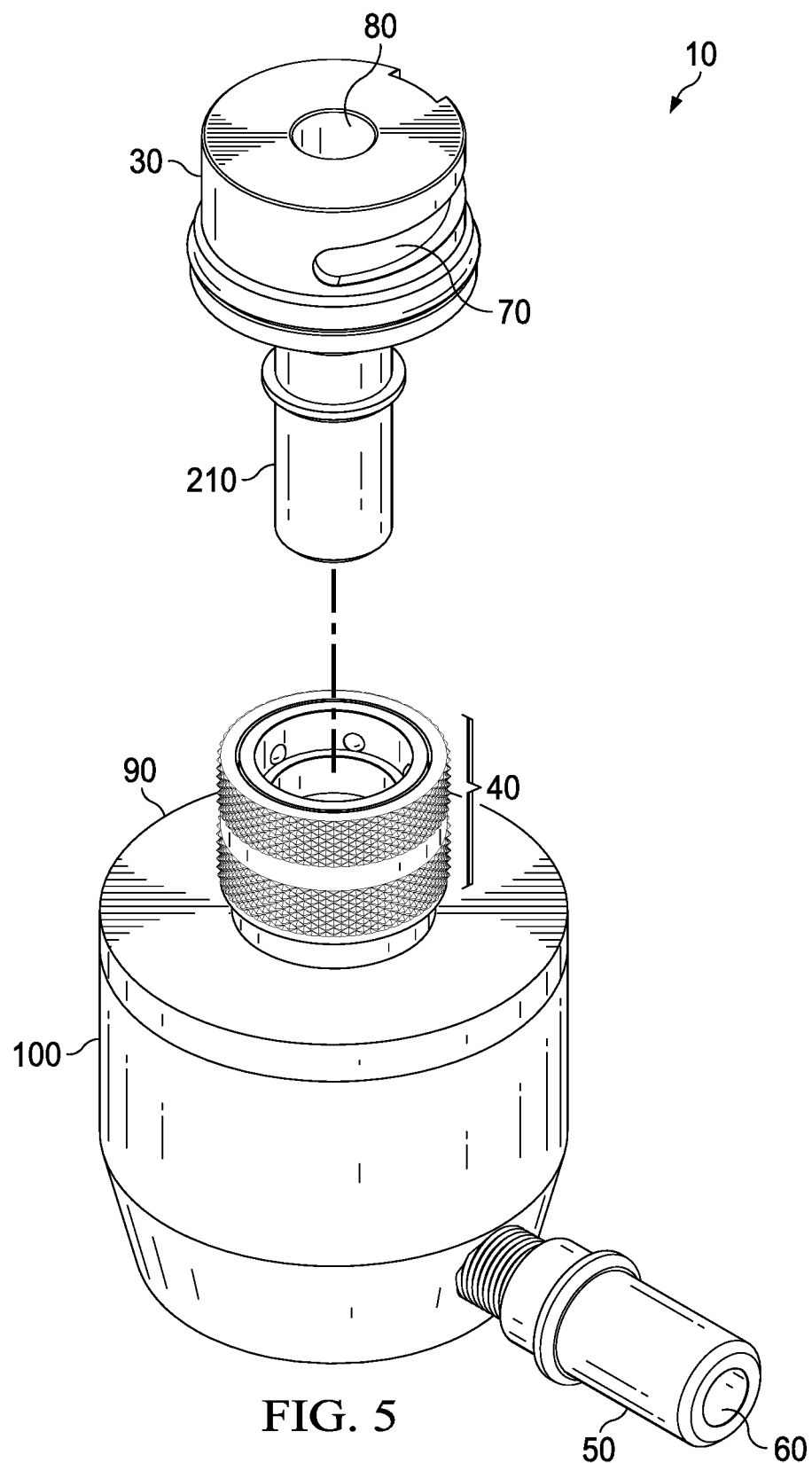
FIG. 5 is an assembly view illustrating, among other things, the removably coupling of the first housing and the second housing of the exemplary embodiment of a clean-side oil and air separator shown in FIG. 1.

As shown in FIGS. 2 and 4, the first housing 20 includes a cap 90 threadingly engaged with main body portion 100. An o-ring 110 may be positioned between the cap 90 and the main body portion 100 to help prevent the passage of fluids therebetween. The air intake 50 is threadingly engaged with the main body portion 100, so that a continuous fluid pathway exists from air intake port 60, through lumen 120 included within air intake 50, to a central chamber 130 disposed within first housing 20. A tubularly-shaped barrier or wall 140 is disposed within central chamber 130. A first end 150 of wall 140 is threadingly engaged to one end 160 of first housing 20. The wall 140 in effect divides the central chamber 130 into a first outer portion 170 and a second inner portion 180. A filter 190 separates outer portion 170 and inner portion 180, so that all fluid flow between outer portion 170 and inner portion 180 must pass through the filter 190. In one embodiment, the filter 190 includes a coalescing filter. In another embodiment, the filter 190 includes a screen. In another embodiment, the filter 190 includes stainless steel wool.

The cap 90 includes a lumen 200 therethrough. At one end, the lumen 200 is in fluid communication with the central chamber 130 at inner portion 180. At the opposite end, the lumen 200 is adapted to receive a portion of an extension 210 of second housing 30. The extension 210 may be a generally tubularly-shaped member including a lumen 220 therethrough. The extension 210 may be threadingly engaged with the main body portion 230 of second housing 30 at lumen 240 therethrough. Thus, a continuous fluid pathway is formed between opening 80 and port 60 through lumen 240, lumen 220, lumen 200, chamber portion 180, filter 190, chamber portion 170, and lumen 120.

Figure 6:
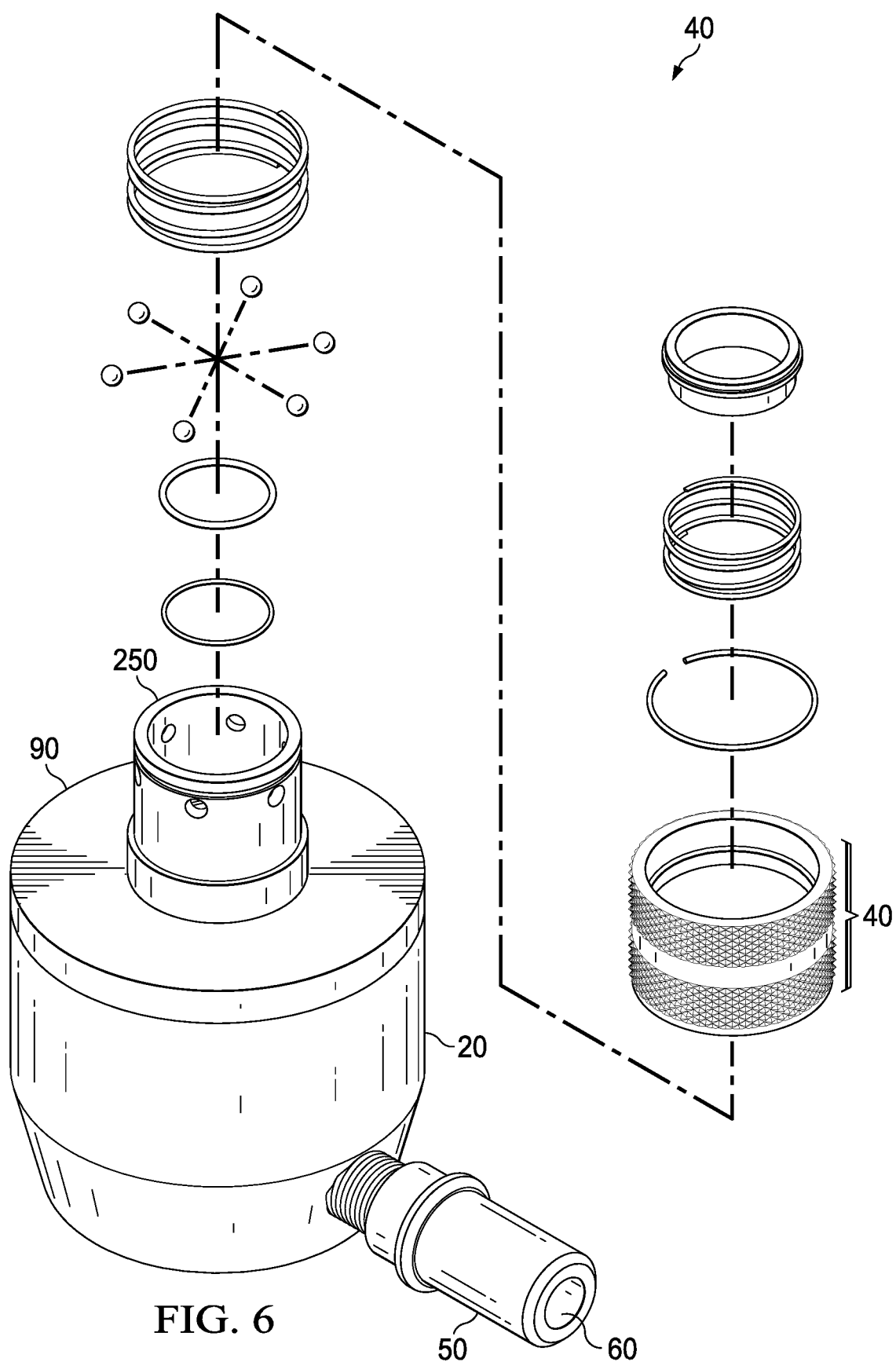
FIG. 6 is an assembly view of the coupler of the exemplary embodiment of a clean-side oil and air separator shown in FIG. 1.
Figure 7:
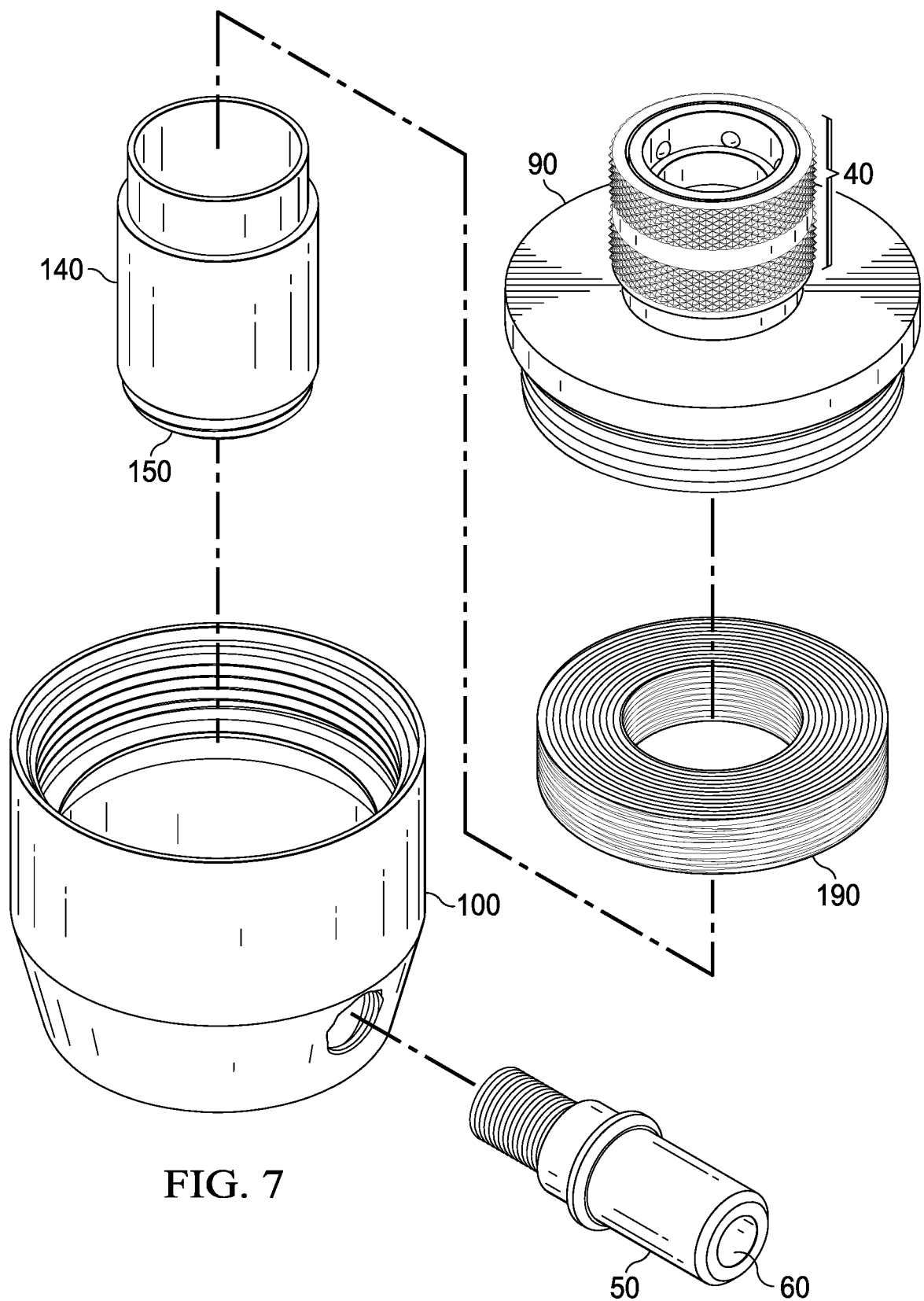
FIG. 7 is an assembly view of the first housing of the exemplary embodiment of a clean-side oil and air separator shown in FIG. 1.

End 250 of cap 90 may be adapted to form, or join with, the coupler 40. The coupler 40 includes an assembly of parts that permits a portion of extension 210 to be releasably received within lumen 200 of cap 90 at end 250. See FIG. 6. AMT or other style couplers may be used.

In accordance with the description herein, a method of oil and air separation may include providing an oil and air separator including a coalescing filter material disposed within a fluid pathway through the separator. The separator may include a first housing including the filter material, a second housing adapted for connecting to an engine oil fill port, and a coupler removably coupling or joining the first housing and the second housing.

Figure 8:
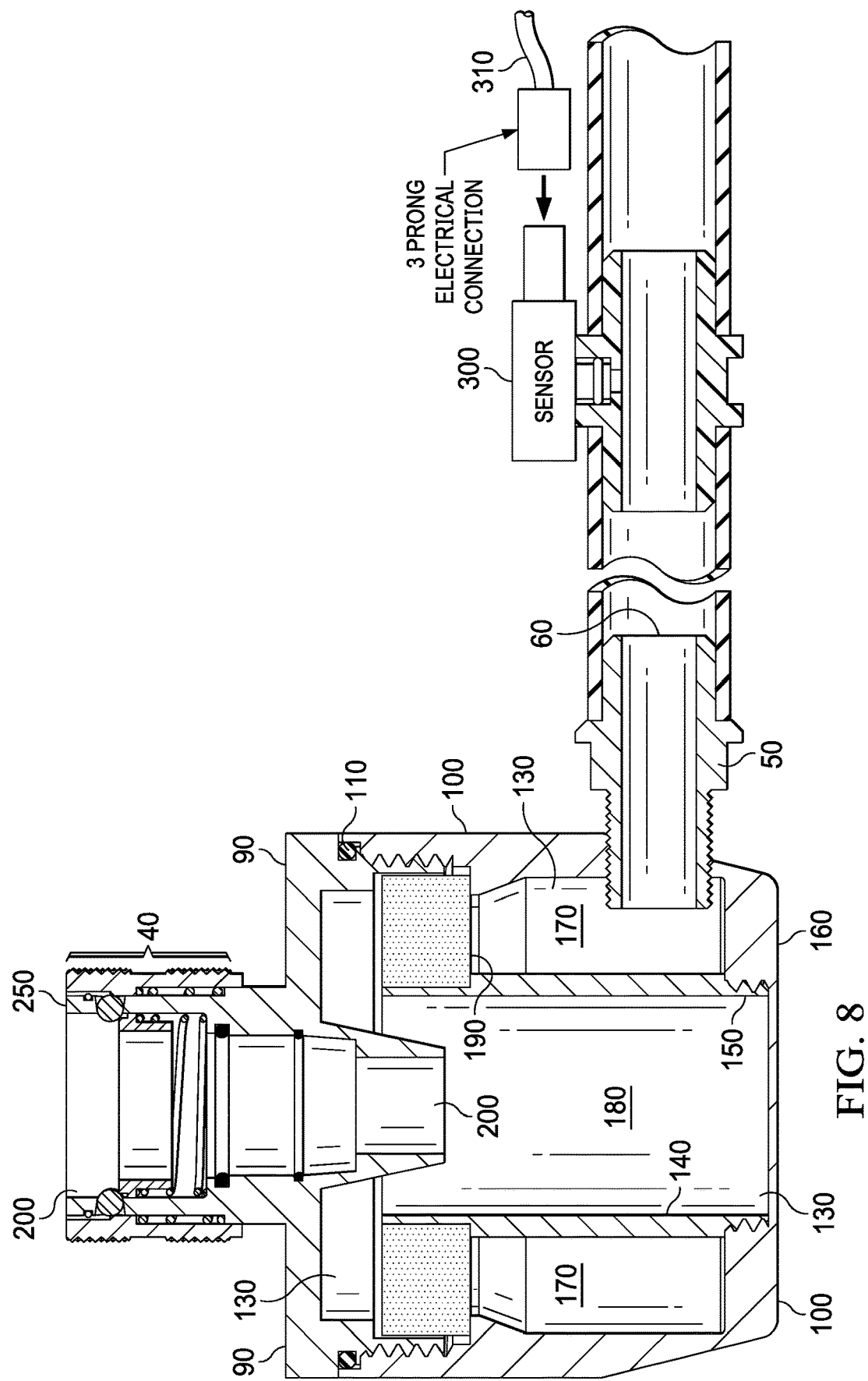
FIG. 8 is a cross-sectional view of an exemplary embodiment of an oil and air separator including an air flow sensor.

As shown in FIG. 8, an alternate embodiment of an oil and air separator including a sensor 300 may be provided. The sensor may be positioned proximate the air intake port 60 of first housing 20. A continuous fluid pathway may extend from the sensor 300 to the air intake port 60 and beyond. The sensor may be provided to measure one or more operating characteristics of the PCV system. In an alternate embodiment, multiple sensors may be provided for the fluid pathway to monitor one or more operating characteristics. The sensor shown in FIG. 8 measures the air flow in the PCV system. The sensor is a variable voltage sensor in that a voltage varies as the air flow in the fluid pathway increases or decreases. When an undesirable air flow is detected, the sensor may indicate a signal via line 310 that is processed to turn on a vehicle's "check engine" light.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. An oil and air separator including:
   (a) a first housing including a central chamber therein divided into a first outer portion and a second inner portion by a barrier;
   (b) a filter material disposed between the first outer portion and the second inner portion;
   (c) an extension including a lumen therethrough; and
   (d) a coupler disposed between and removably coupling the first housing and the extension;
   wherein the first housing includes a cap including a first lumen therethrough, the first lumen including a first end disposed at the second inner portion, and a second end adapted to removably receive an end of the extension to create a fluid pathway from the lumen of the extension to the second inner portion.

2. The oil and air separator of claim 1, wherein the filter material is a coalescing filter material.

3. The oil and air separator of claim 2, wherein the coalescing filter material includes steel wool.

4. An oil and air separator including:
   (a) a first housing including a central chamber therein, the central chamber divided into a first outer portion and a second inner portion by a barrier;
   (b) a filter material disposed between the first outer portion and the second inner portion;

(c) a cap directly coupled to the first housing, the cap including a first lumen therethrough, the first lumen including a first end disposed at the second inner portion;

(d) an extension portion including a second lumen therethrough; and (e) a coupler removably coupling the cap and the extension portion.

5. The oil and air separator of claim 4, wherein the filter material is a coalescing filter material.

6. The oil and air separator of claim 5, wherein the coalescing filter material includes steel wool.

7. The oil and air separator of claim 4, wherein a continuous fluid pathway exists from the first outer portion and through the filter material, and the first lumen to the second lumen.

8. The oil and air separator of claim 4, wherein the extension is threadingly engaged with a second housing.

9. The oil and air separator of claim 4, wherein the cap is removably threadingly coupled to the first housing.

10. The oil and air separator of claim 4, wherein a portion of the filter material is held between the cap and the first housing.

11. An oil and air separator including:
(a) a first housing including a central chamber therein, the central chamber divided into a first outer portion and a second inner portion by a barrier; and
(b) a cap directly coupled to the first housing, the cap including a first lumen therethrough, the first lumen including a first end disposed at the second inner portion.

12. The oil and air separator of claim 11, wherein a filter material is disposed between the first outer portion and the second inner portion.

13. The oil and air separator of claim 11, comprising an extension portion including a second lumen therethrough; and a coupler removably coupling the cap and the extension portion.

14. The oil and air separator of claim 13, wherein a filter material is disposed between the first outer portion and the second inner portion.

* * * * *